United States Patent
Aoyama et al.

(10) Patent No.: US 10,308,289 B2
(45) Date of Patent: Jun. 4, 2019

(54) FRONT FENDER AND WHEEL LOADER

(71) Applicant: Komatsu Ltd., Tokyo (JP)

(72) Inventors: Yuichiro Aoyama, Tokyo (JP); Yohei Seto, Tokyo (JP)

(73) Assignee: Komatsu Ltd., Tokyo (JP)

( * ) Notice: Subject to any disclaimer, the term of this patent is extended or adjusted under 35 U.S.C. 154(b) by 77 days.

(21) Appl. No.: 15/519,952

(22) PCT Filed: Dec. 8, 2016

(86) PCT No.: PCT/JP2016/086646
§ 371 (c)(1),
(2) Date: Apr. 18, 2017

(87) PCT Pub. No.: WO2018/105093
PCT Pub. Date: Jun. 14, 2018

(65) Prior Publication Data
US 2018/0334193 A1 Nov. 22, 2018

(51) Int. Cl.
*B62D 25/18* (2006.01)
*B62D 25/16* (2006.01)
(Continued)

(52) U.S. Cl.
CPC ............ *B62D 25/18* (2013.01); *B62D 25/168* (2013.01); *E02F 9/0808* (2013.01); *E02F 9/0858* (2013.01); *E02F 3/34* (2013.01)

(58) Field of Classification Search
CPC .. B60R 3/00; B60R 3/02; B60R 3/005; B60R 3/07; E02F 9/08
See application file for complete search history.

(56) References Cited

U.S. PATENT DOCUMENTS

| 4,268,053 A | 5/1981 | Toppins et al. | |
|---|---|---|---|
| 6,179,312 B1 * | 1/2001 | Paschke | B60R 3/02 105/444 |
| 2012/0274101 A1 | 11/2012 | Myslak et al. | |

FOREIGN PATENT DOCUMENTS

| CN | 104249775 A | 12/2014 |
|---|---|---|
| CN | 105860289 A | 8/2016 |

(Continued)

OTHER PUBLICATIONS

International Search Report and Written Opinion dated Feb. 7, 2017, issued for PCT/JP2016/086646.
(Continued)

*Primary Examiner* — James A Shriver, II
*Assistant Examiner* — James J Triggs
(74) *Attorney, Agent, or Firm* — Locke Lord LLP

(57) ABSTRACT

A front fender includes: a first member, at least a part of which is disposed upward with respect to a front tire of a wheel loader; a second member which includes an upper plate having an upper surface facing a lower surface of the first member, and a rear plate which is connected to a rear end of the upper plate and disposed rearward with respect to the front tire; an inclined plate which is connected to a lower surface of the upper plate and a front surface of the rear plate; and a connecting member which connects the upper plate and the first member. The inclined plate includes: a through hole which is provided immediately below the connecting member and through which the connecting member can pass; and a notch hole which is provided at a lower end of the inclined plate.

8 Claims, 15 Drawing Sheets

(51) Int. Cl.
*E02F 9/08* (2006.01)
*E02F 3/34* (2006.01)

(56) References Cited

FOREIGN PATENT DOCUMENTS

| | | |
|---|---|---|
| CN | 205661548 U | 10/2016 |
| EP | 2873777 A1 | 5/2015 |
| JP | 11-321720 A | 11/1999 |
| JP | 11-342867 A | 12/1999 |
| JP | 2005-041405 A | 2/2005 |
| JP | 2007-106302 A | 4/2007 |

OTHER PUBLICATIONS

Extended European Search Report dated Oct. 11, 2018, issued for European patent application No. 16856452.4.

* cited by examiner

FRONT FENDER AND WHEEL LOADER

FIELD

The present invention relates to a front fender and a wheel loader.

BACKGROUND

A wheel loader includes a front fender that is disposed partly around a front tire. The front fender prevents dirt, which flies off while the wheel loader is in motion, from hitting an operator's cab and the like.

CITATION LIST

Patent Literature

Patent Literature 1: Japanese Laid-Open Patent Application No. 11-321'720

SUMMARY

Technical Problem

The front fender is in some cases detachably mounted to a vehicle body frame of the wheel loader by using a connecting member such as a bolt. With the front fender detachably mounted to the vehicle body frame, replacement of the front fender or the front tire can be performed smoothly. When the front fender is large in size, however, the difficulty of mounting and removing the front fender to/from the vehicle body frame increases. Accordingly, the replacement of the front fender or the front tire can be expected to be improved in efficiency by optimizing the structure of the front fender and the attachment structure of the front fender to the vehicle body frame.

An aspect of the present invention aims at providing a front fender and a wheel loader, the front fender being smoothly mounted and removed to/from a vehicle frame body.

Solution to Problem

According to a first aspect of the present invention, a front fender comprises: a first member, at least a part of which is disposed upward with respect to a front tire of a wheel loader; a second member which includes an upper plate having an upper surface facing a lower surface of the first member, and a rear plate which is connected to a rear end of the upper plate and disposed rearward with respect to the front tire; an inclined plate which is connected to a lower surface of the upper plate and a front surface of the rear plate; and a connecting member which connects the upper plate and the first member, wherein the inclined plate includes a through hole which is provided immediately below the connecting member and through which the connecting member can pass, and a notch hole which is provided at a lower end of the inclined plate.

According to a second aspect of the present invention, a wheel loader comprises a vehicle body frame to which the front fender according to the first aspect is mounted.

Advantageous Effects of Invention

According to an aspect of the present invention, the front fender smoothly mounted and removed to/from the vehicle body frame and the wheel loader are provided.

DESCRIPTION OF EMBODIMENTS

An embodiment according to the present invention will now be described with reference to the drawings; however, the present invention is not limited to the embodiment.

Components in the embodiment described below can be combined as appropriate. There is also a case where some of the components are not used. Note that in each drawing, a hidden part is partly indicated by a broken line in order to supplement the description.

[Wheel Loader]

Figure 1:
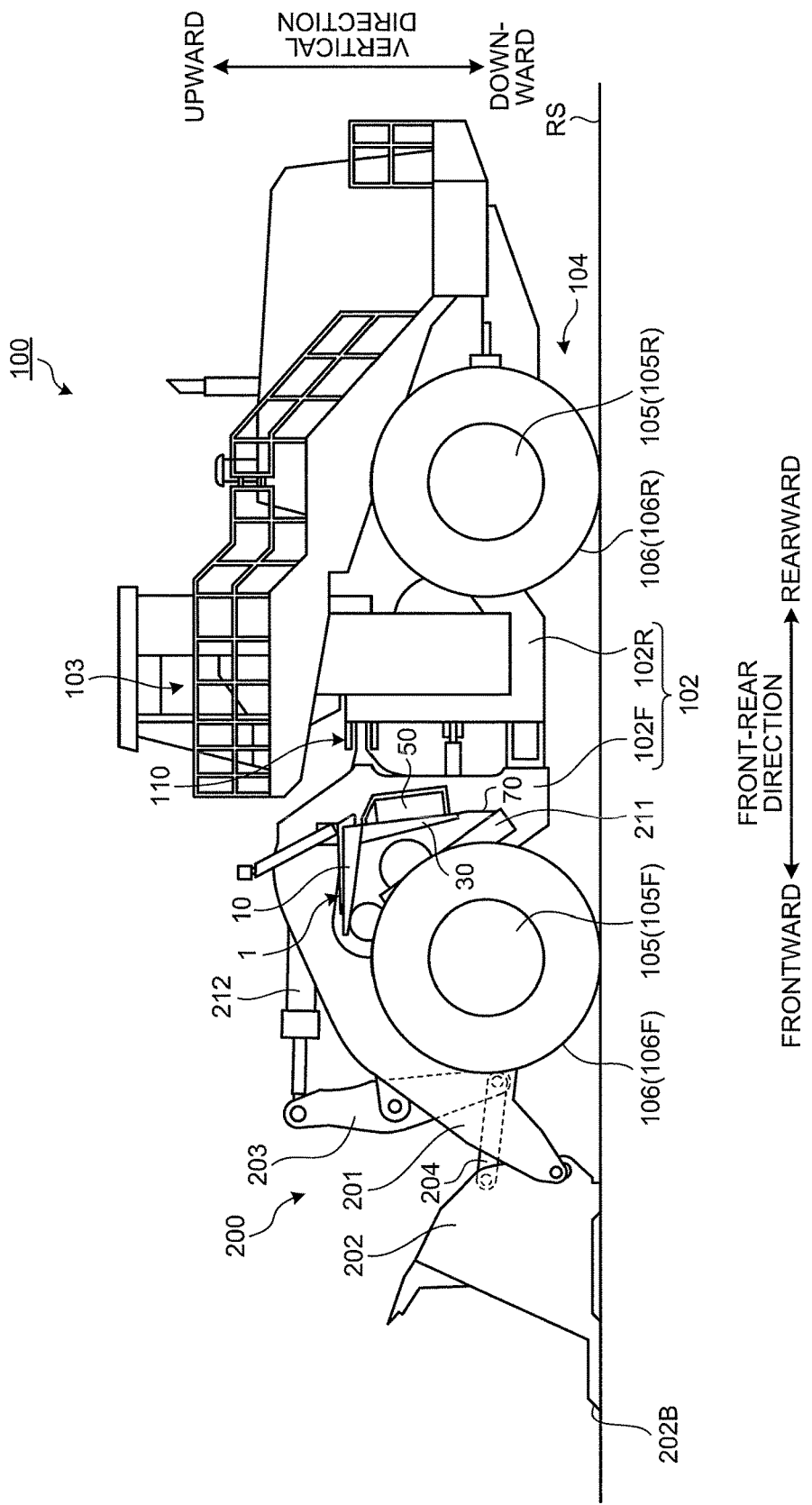
FIG. 1 is a side view illustrating an example of a wheel loader according to the present embodiment.
Figure 2:
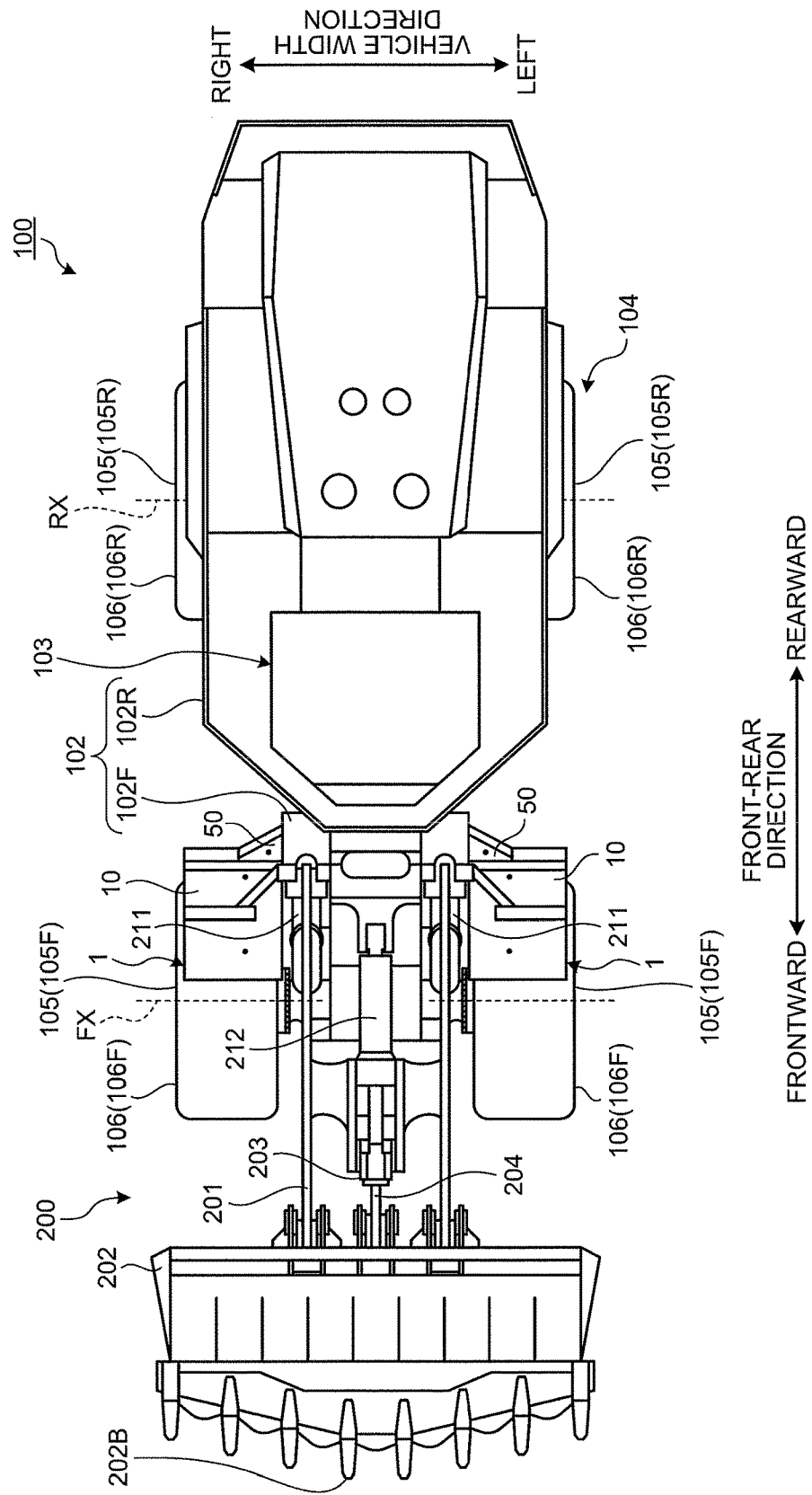
FIG. 2 is a top view illustrating an example of the wheel loader according to the present embodiment.
Figure 3:
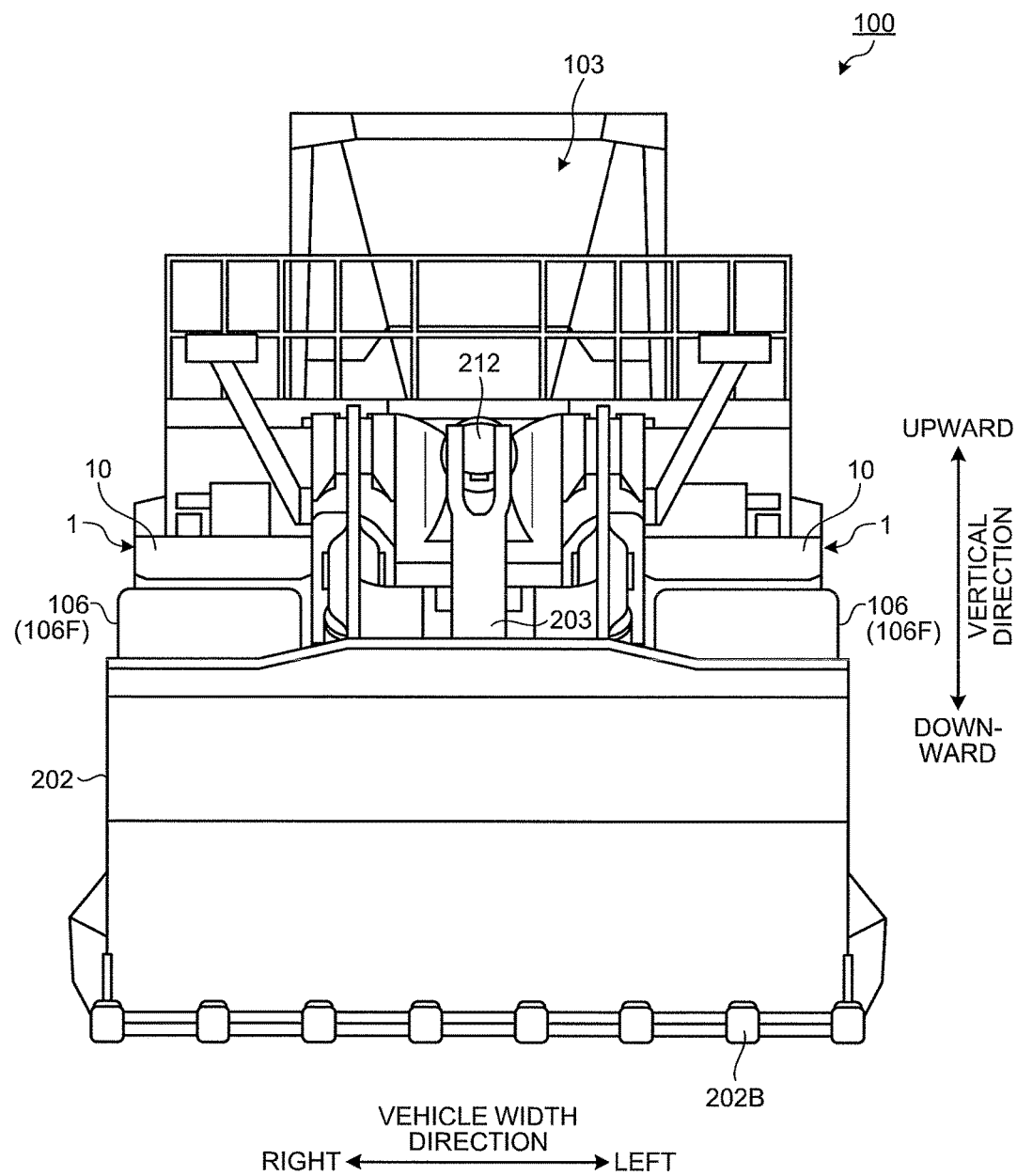
FIG. 3 is a front view illustrating an example of the wheel loader according to the present embodiment.

FIG. 1 is a side view illustrating an example of a wheel loader 100 according to the present embodiment. FIG. 2 is a top view illustrating an example of the wheel loader 100 according to the present embodiment. FIG. 3 is a front view illustrating an example of the wheel loader 100 according to the present embodiment. The wheel loader 100 is a loading machine that scoops up dirt by a bucket 202 and loads it onto a transporting machine. The wheel loader 100 is used in a mine, for example, to transport dirt and crushed rock and to load dirt and crushed rock onto a dump truck.

As illustrated in FIGS. 1, 2, and 3, the wheel loader 100 includes a vehicle body frame 102, an operator's cab 103 provided with an operator's seat, a traveling unit 104, a work implement 200 supported by the vehicle body frame 102, and a front fender 1 mounted to the vehicle body frame 102.

The vehicle body frame 102 includes a front frame 102F and a rear frame 102R. The front frame 102F and the rear frame 102R are connected via a joint mechanism 110.

The wheel loader 100 is operated by an operator in the operator's cab 103. An operation unit to be operated by the operator is disposed in the operator's cab 103. The operation unit includes, for example, an accelerator pedal, a brake pedal, a transmission shift lever, and a work implement lever used to operate the work implement 200. The operator operates the operation unit to make an adjustment of the travel speed of the wheel loader 100, switch between a forward movement and a backward movement, and operate the work implement 200.

The traveling unit 104 includes wheels 105. Tires 106 are fitted to the wheels 105. The wheels 105 include two front wheels 105F supported by the front frame 102F, and two rear wheels 105R supported by the rear frame 102R. The tires 106 include front tires 106F fitted to the front wheels 105F, and rear tires 106R fitted to the rear wheels 105R. The traveling unit 4 can travel on the ground RS.

The front wheels 105F and the front tires 106F can rotate about an axle FX. The rear wheels 105R and the rear tires 106R can rotate about an axle RX.

In the following description, a direction parallel to the axle FX of the front tires 106F will be referred to as a vehicle width direction as appropriate, a direction orthogonal to treads of the front tires 106F in contact with the ground RS will be referred to as a vertical direction as appropriate, and a direction orthogonal to both the vehicle width direction and the vertical direction will be referred to as a front-rear direction as appropriate. The axle FX and the axle RX are parallel to each other when the wheel loader 1 travels in a straight line.

Moreover, in the following description, a position or a direction closer to the center of the vehicle body frame 102 in the vehicle width direction will be referred to as an inner side or inward as appropriate, while a position or a direction farther from the center of the vehicle body frame 102 will be referred to as an outer side or outward in the vehicle width direction as appropriate. A position or a direction closer to the work implement 200 in the front-rear direction will be referred to as a front side or frontward as appropriate, while a side or a direction opposite to the front side or frontward will be referred to as a rear side or rearward as appropriate. A position or a direction closer to the treads of the front tires 106F in the vertical direction will be referred to as a lower side or downward as appropriate, while a side or a direction opposite to the lower side or downward will be referred to as an upper side or upward as appropriate.

Furthermore, in the following description, a virtual axis parallel to the vehicle width direction will be referred to as a vehicle width axis as appropriate. A virtual axis parallel to the front-rear direction will be referred to as a front-rear axis as appropriate. A virtual axis parallel to the vertical direction will be referred to as a vertical axis as appropriate.

The front frame 102F is disposed frontward with respect to the rear frame 102R. The front wheels 105F and the front tires 106F are disposed frontward with respect to the rear wheels 105R and the rear tires 106R.

The work implement 200 includes a boom 201 connected to the vehicle body frame 102, the bucket 202, a bell crank 203, and a link 204.

The boom 201 is brought into action by power that is generated by a boom cylinder 211. The boom cylinder 211 is a hydraulic cylinder that generates the power to move the boom 201. One end of the boom cylinder 211 is connected to the vehicle body frame 102. Another end of the boom cylinder 211 is connected to the boom 201. Two boom cylinders 211 are provided. One of the boom cylinders 211 is provided on the right of the center of the vehicle body frame 102 in the vehicle width direction. The other boom cylinder 211 is provided on the left of the center of the vehicle body frame 102 in the vehicle width direction. The boom cylinders 211 are extended or contracted when the operator operates the work implement lever. This allows the boom 201 to move in the vertical direction.

The bucket 202 is an excavating member including a plurality of blades 202B, for example. Note that the excavating member may instead be a blade with a straight edge without including the plurality of blades. The bucket 202 is connected to an end of the boom 201. The bucket 202 is also connected to the link 204. A part of the bell crank 203 is turnably connected to the boom 201. One end of a bucket cylinder 212 is connected to the vehicle body frame 102. Another end of the bucket cylinder 212 is connected to one end of the bell crank 203. Another end of the bell crank 203 is connected to the bucket 202 via the link 204. The bucket 202 is thus brought into action by power that is generated by the bucket cylinder 212. The bucket cylinder 212 is a hydraulic cylinder that generates the power to move the bucket 202. One bucket cylinder 212 is provided. The bucket cylinder 212 is arranged at the center of the vehicle width direction. The bucket cylinder 212 is extended or contracted when the operator operates the work implement lever. This allows the bucket 202 to perform a tilt operation or a dump operation.

The front fender 1 is mounted to the front frame 102F. The front fender 1 is disposed partly around the front tire 106F. The front fender 1 is mounted to each of left and right parts of the front frame 102F. The front fender 1 prevents dirt from hitting the operator's cab 103, the vehicle body frame 102, an outer casing supported by the vehicle body frame 102 and the like when the dirt flies off the ground RS while the wheel loader 100 is in motion.

[Front Fender]

Figure 4:
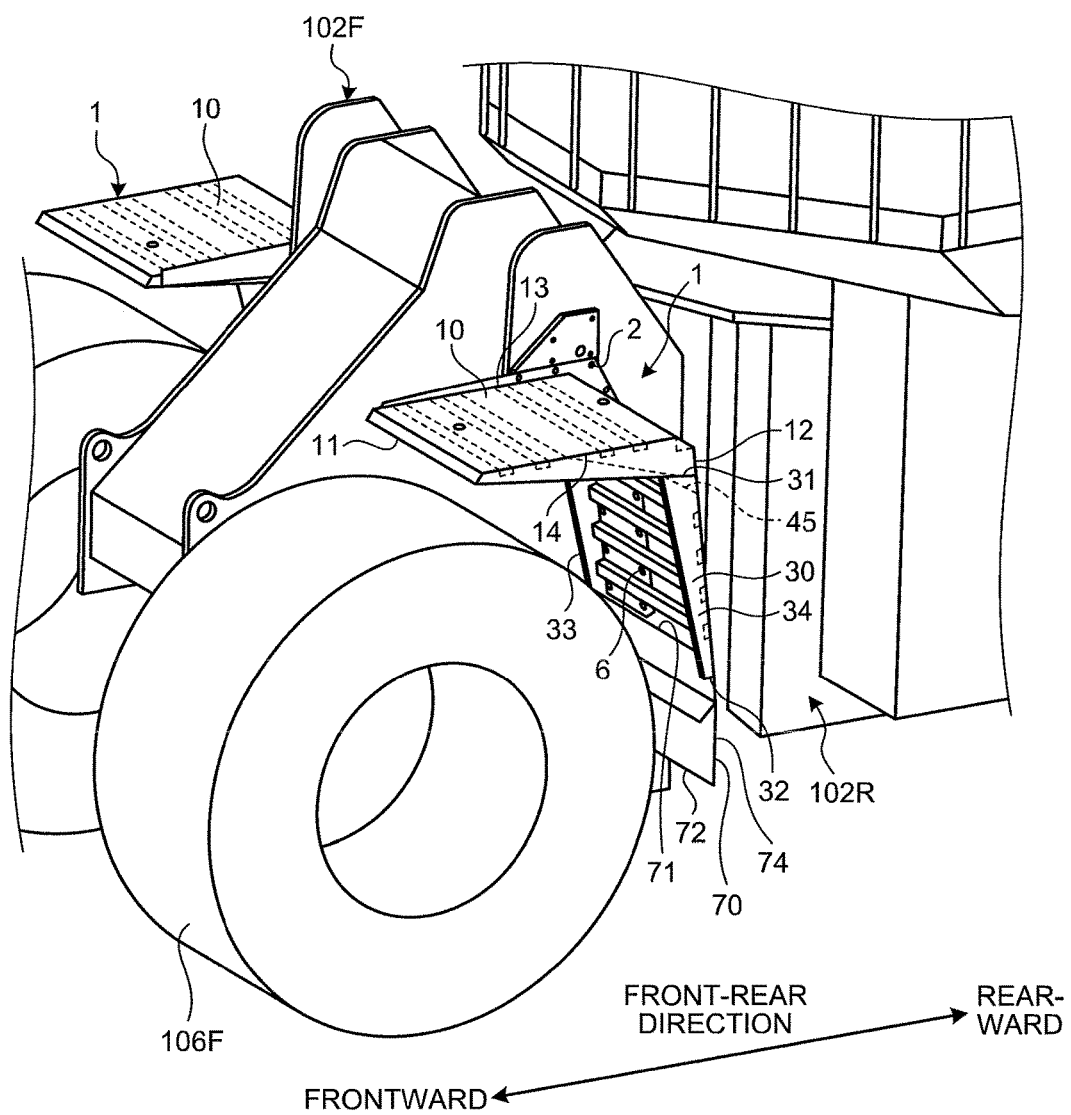
FIG. 4 is a left front perspective view of a front frame to which a front fender of the present embodiment is mounted.
Figure 5:
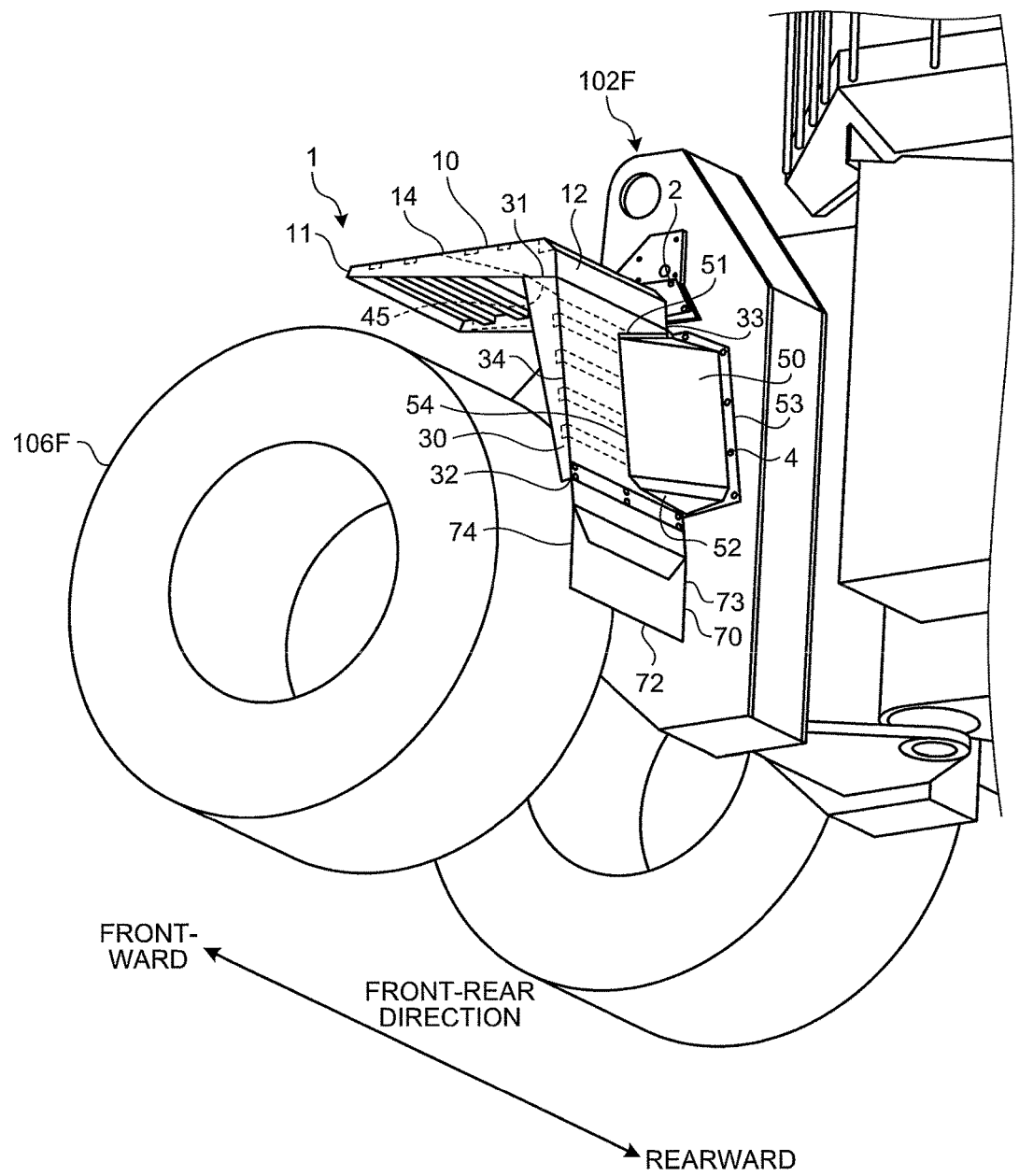
FIG. 5 is a left rear perspective view of the front frame to which the front fender of the present embodiment is mounted.
Figure 6:
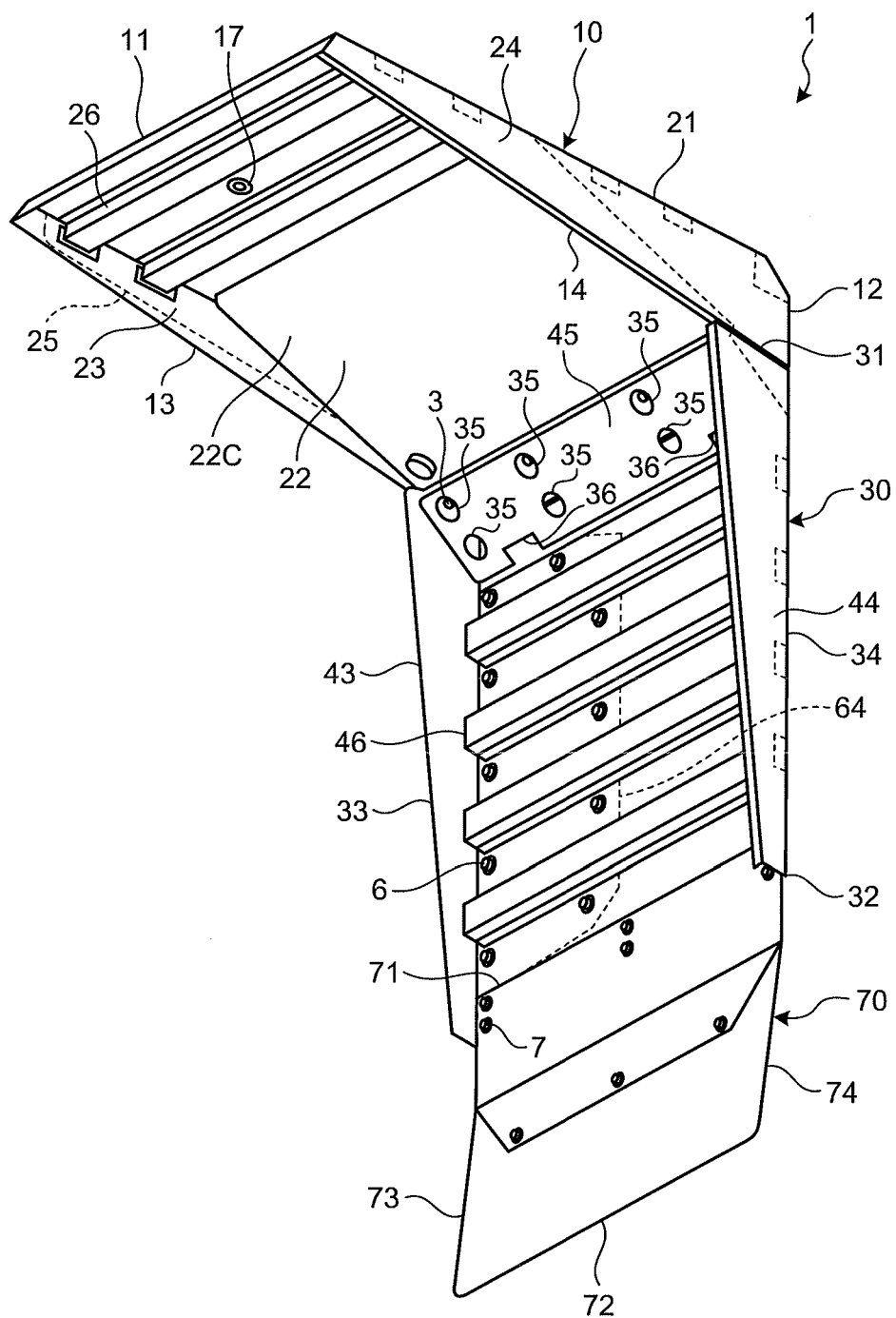
FIG. 6 is a front perspective view of the front fender according to the present embodiment.
Figure 7:
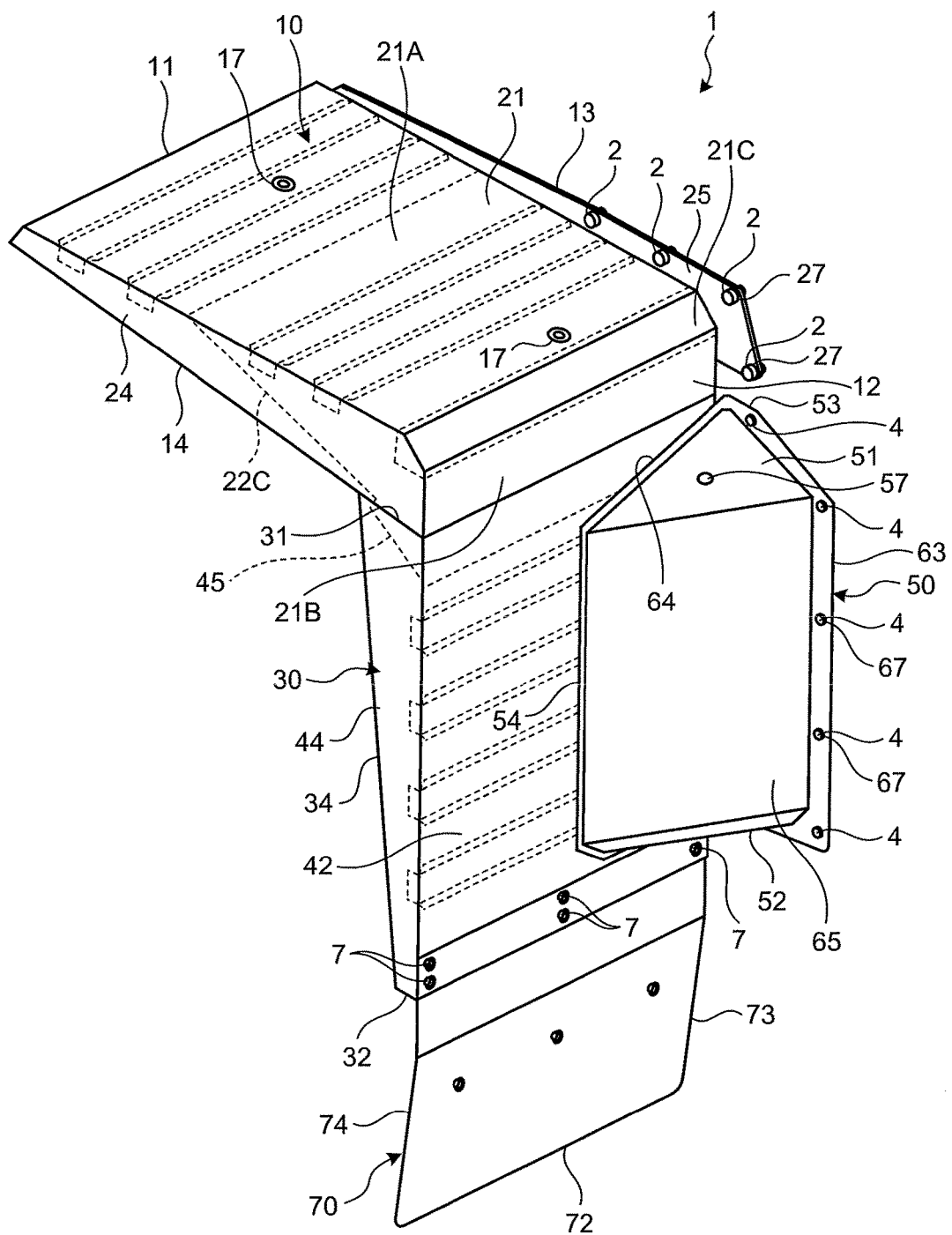
FIG. 7 is a rear perspective view of the front fender according to the present embodiment.

FIG. 4 is a left front perspective view of the front frame 102F to which the front fender 1 of the present embodiment is mounted. FIG. 5 is a left rear perspective view of the front frame 102F to which the front fender 1 of the present embodiment is mounted. FIG. 6 is a front perspective view of the front fender 1 according to the present embodiment. FIG. 7 is a rear perspective view of the front fender 1 according to the present embodiment. Note that in FIGS. 4 and 5, members such as the work implement 200 are omitted in order to provide a clear view of the relationship between the front fender 1 and the front frame 102F.

As illustrated in FIGS. 1, 2, 3, 4, and 5, the front fender 1 includes a first member 10, at least a part of which is disposed upward with respect to the front tire 106F, a second member 30 disposed rearward with respect to the front tire 106F, an inclined plate 45, a third member 50 provided at a rear portion of the second member 30, and a guard member 70 provided at the bottom of the second member 30. The first member 10, the second member 30, the third member 50 and the guard member 70 are separate members.

The first member 10 is made of metal. As illustrated in FIGS. 4, 5, 6, and 7, the first member 10 includes a front end 11, a rear end 12 disposed rearward with respect to the front end 11, an inner end 13, and an outer end 14 disposed on the outer side in the vehicle width direction with respect to the inner end 13.

At least a part of the first member 10 is disposed upward with respect to the front tire 106F. While disposed upward with respect to the front tire 106F, the front end 11 of the first member 10 is disposed rearward with respect to the axle FX of the front tire 106F and frontward with respect to a rear end of the front tire 106F. The rear end 12 of the first member 10 is disposed rearward with respect to the rear end of the front tire 106F while being disposed upward with respect to the front tire 106F. Note that a front end of the front tire 106F corresponds to the most frontward position of the front tire 106F, whereas the rear end of the front tire 106F corresponds to the most rearward position of the front tire 106F.

In the vehicle width direction, the position of the inner end 13 of the first member 10 substantially corresponds with the position of an inner end of the front tire 106F. In the vehicle width direction, the outer end 14 of the first member 10 is disposed on the inner side with respect to an outer end of the front tire 106F but on the outer side with respect to the center of the front tire 106F. That is, in the vehicle width direction, the first member 10 is disposed to cover most of the front tire 106F except for a part of the front tire 106F including the outer end thereof. Accordingly, a swing radius of the wheel loader 100 is determined on the basis of at least a track of the outer end of the front tire 106F. The front end 11 of the first member 10 is disposed rearward with respect to at least the front end of the front tire 106F so that the top of a front part of the front tire 106F is exposed from the first member 10. The operator in the operator's seat can thus visually identify the front end of the front tire 106F. As a result, the operator can operate the wheel loader 100 while being conscious of the swing radius at the time of swinging. The operator can also operate the wheel loader 100 while checking whether or not a rock or the like lies ahead of the front tire 106F.

The second member 30 is made of metal. As illustrated in FIGS. 4, 5, 6, and 7, the second member 30 includes an upper end 31, a lower end 32 disposed downward with respect to the upper end 31, an inner end 33, and an outer end 34 disposed on the outer side in the vehicle width direction with respect to the inner end 33.

The second member 30 is disposed rearward with respect to the front tire 106F. The upper end 31 of the second member 30 is disposed upward with respect to an upper end of the front tire 106F. The lower end 32 of the second member 30 is disposed downward with respect to the upper end of the front tire 106F and upward with respect to the axle FX of the front tire 106F.

In the vehicle width direction, the position of the inner end 33 of the second member 30 substantially corresponds with the position of the inner end 13 of the first member 10. In the vehicle width direction, the position of the outer end 34 of the second member 30 substantially corresponds with the position of the outer end 14 of the first member 10.

The inclined plate 45 is made of metal. In the present embodiment, the inclined plate 45 is connected to the second member 30 by welding, for example. Note that the inclined plate 45 may be detachably mounted to the second member 30.

The third member 50 is made of metal. As illustrated in FIGS. 5, 6, and 7, the third member 50 includes an upper end 51, a lower end 52 disposed downward with respect to the upper end 51, an inner end 53, and an outer end 54 disposed on the outer side in the vehicle width direction with respect to the inner end 53.

The third member 50 is disposed rearward with respect to the second member 30. The upper end 51 of the third member 50 is disposed downward with respect to the upper end 31 of the second member 30. The lower end 52 of the third member 50 is disposed upward with respect to the lower end 32 of the second member 30.

In the vehicle width direction, the position of the inner end 53 of the third member 50 substantially corresponds with the positions of the inner ends 13 and 33 of the first and second members 10 and 30. In the vehicle width direction, the outer end 54 of the third member 50 is disposed on the inner side with respect to the outer end 14 of the first member 10 and the outer end 34 of the second member 30.

The guard member 70 is made of flexible rubber or plastic. As illustrated in FIGS. 4, 5, 6, and 7, the guard member 70 includes an upper end 71, a lower end 72 disposed downward with respect to the upper end 71, an inner end 73, and an outer end 74 disposed on the outer side in the vehicle width direction with respect to the inner end 73.

The guard member 70 is disposed rearward with respect to the front tire 106F. The upper end 71 of the guard member 70 is disposed upward with respect to the lower end 32 of the second member 30. The lower end 72 of the guard member 70 is disposed downward with respect to the lower end 32 of the second member 30 as well as the axle FX of the front tire 106F, and upward with respect to a lower end of the front tire 106F.

In the vehicle width direction, the position of the inner end 73 of the guard member 70 substantially corresponds with the position of the inner end 33 of the second member 30. In the vehicle width direction, the position of the outer end 74 of the guard member 70 substantially corresponds with the position of the outer end 34 of the second member 30.

As illustrated in FIGS. 4, 5, 6, and 7, the first member 10 is detachably connected to the front frame 102F by a connecting member 2. The first member 10 is detachably connected to the second member 30 by a connecting member 3. The second member 30 is detachably connected to the third member 50 by a connecting member 6. The second member 30 is detachably connected to the guard member 70 by a connecting member 7. In the present embodiment, the second member 30 is not directly connected to the front frame 102F. The third member 50 is detachably connected to the front frame 102F by a connecting member 4. In the present embodiment, the third member 50 is not directly connected to the first member 10. The connecting members 2, 3, 4, 6, and 7 are bolts in the present embodiment.

[First Member]

Figure 8:
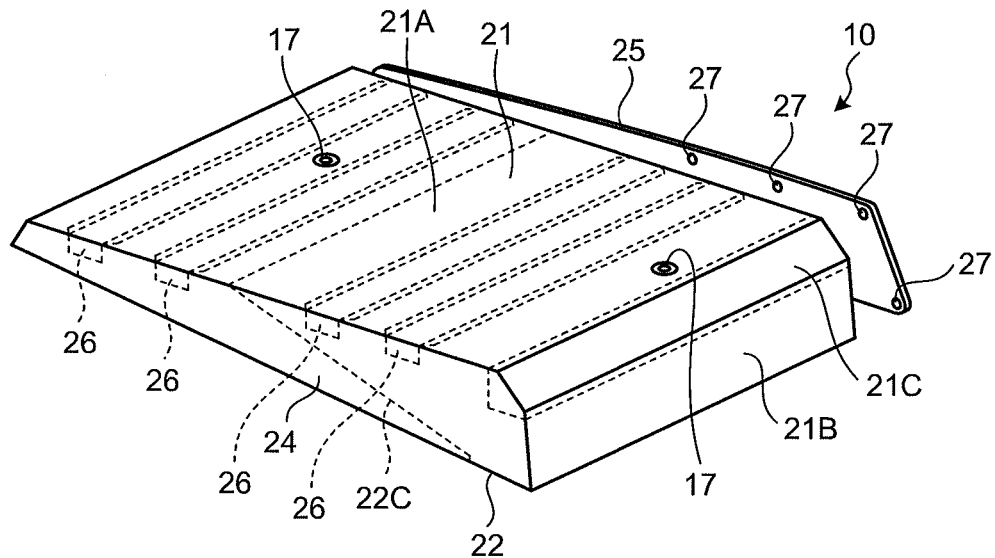
FIG. 8 is an upper perspective view of a first member according to the present embodiment.
Figure 9:
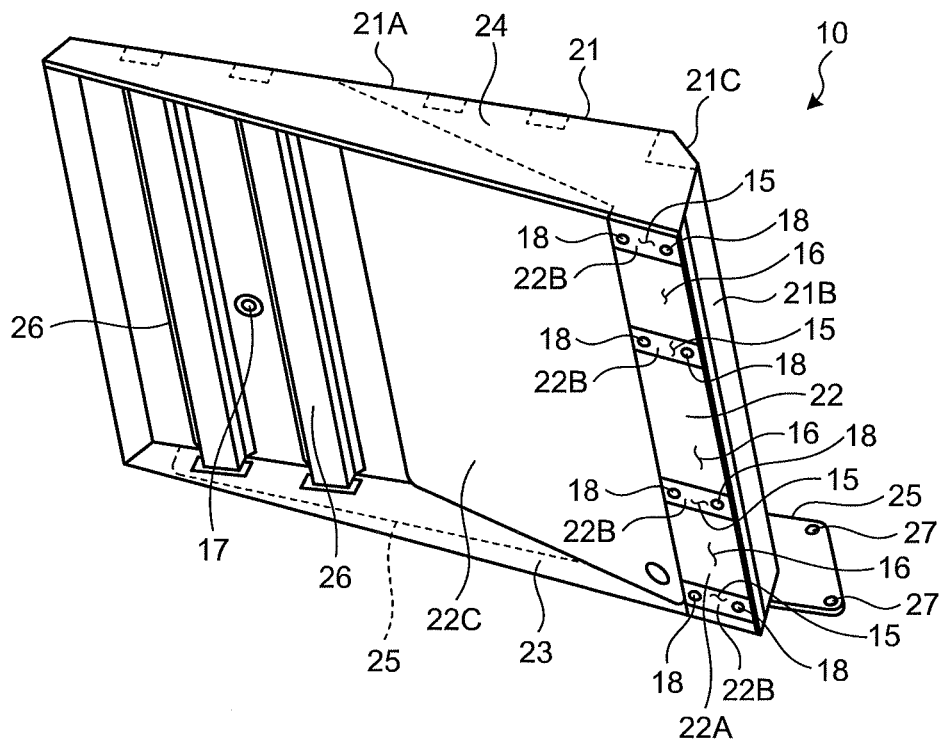
FIG. 9 is a lower perspective view of the first member according to the present embodiment.

FIG. 8 is an upper perspective view of the first member 10 according to the present embodiment. FIG. 9 is a lower perspective view of the first member 10 according to the present embodiment. As illustrated in FIGS. 6, 7, 8, and 9, the first member 10 includes at least an upper plate 21, a lower plate 22, an inner plate 23 disposed on the inner side in the vehicle width direction, an outer plate 24 disposed on the outer side in the vehicle width direction, a connecting plate 25 fixed to the inner plate 23, and a rib member 26 provided on a lower surface of the upper plate 21.

The upper plate 21 includes a flat plate 21A that has an upper surface facing upward, a rear plate 21B that is disposed rearward with respect to the flat plate 21A and has a rear surface facing rearward, and an inclined plate 21C provided between the flat plate 21A and the rear plate 21B.

The upper plate 21, the inner plate 23, and the outer plate 24 are formed by bending a sheet of metal, for example. The flat plate 21A, the rear plate 21B, the inclined plate 21C, the inner plate 23, and the outer plate 24 are each a flat plate with a uniform thickness.

The upper and lower surfaces of the flat plate 21A are substantially orthogonal to the vertical axis. A front surface and the rear surface of the rear plate 21B are substantially orthogonal to the front-rear axis. The inclined plate 21C is connected to each of a rear end of the flat plate 21A and an upper end of the rear plate 21B. The inclined plate 21C is inclined downward and rearward.

The inner plate 23 includes an inner surface that can face the front frame 102F and an outer surface that faces an opposite direction from the inner surface. The inner and outer surfaces of the inner plate 23 are substantially orthogonal to the vehicle width axis, or the axle. An upper end of the inner plate 23 is connected to an inner end of the flat plate 21A. A rear portion of the inner plate 23 is connected to an inner end of the inclined plate 21C and an inner end of the rear plate 21B. A lower end of the inner plate 23 is inclined downward and rearward.

The outer plate 24 includes an inner surface that faces the outer surface of the inner plate 23 while being spaced therefrom, and an outer surface that faces an opposite direction from the inner surface. The inner and outer surfaces of the outer plate 24 are substantially orthogonal to the vehicle width axis. An upper end of the outer plate 24 is connected to an outer end of the flat plate 21A. A rear portion of the outer plate 24 is connected to an outer end of the inclined plate 21C and an outer end of the rear plate 21B. A lower end of the outer plate 24 is inclined downward and rearward.

In the present embodiment, the outer shape and dimensions of the inner plate 23 are substantially identical to the outer shape and dimensions of the outer plate 24. Note that the outer shape of the inner plate 23 may be different from the outer shape of the outer plate 24.

The rib member 26 is fixed to a lower surface of the flat plate 21A of the upper plate 21. The rib member 26 is long in the vehicle width direction. One end of the rib member 26 is connected to the inner plate 23. Another end of the rib member 26 is connected to the outer plate 24. A plurality of the rib members 26 is provided at intervals in the front-rear direction. In the present embodiment, the rib member 26 is welded to each of the upper plate 21, the inner plate 23, and the outer plate 24.

The lower plate 22 includes a flat plate 22A disposed at a rear portion of the first member 10, a plurality of spacers 22B provided on the flat plate 22A, and an inclined plate 22C provided frontward with respect to the flat plate 22A.

The flat plate 22A and the inclined plate 22C are formed by bending a sheet of metal, for example. The flat plate 22A and the inclined plate 22C are each a flat plate with a uniform thickness.

Upper and lower surfaces of the flat plate 22A are substantially orthogonal to the vertical axis. The flat plate 22A is connected to the lower end of the rear plate 21B of the upper plate 21, the rear portion of the lower end of the inner plate 23, and the rear portion of the lower end of the outer plate 24.

The inclined plate 22C is inclined downward and rearward. The inclined plate 22C is connected to, for example, a central portion in the front-rear direction on the lower surface of the flat plate 21A of the upper plate 21 and a front end of the flat plate 22A.

The spacer 22B is provided on a lower surface of the flat plate 22A. The plurality of the spacers 22B is provided at intervals in the vehicle width direction. The spacers 22B are welded to the lower surface of the flat plate 22A.

A lower surface of the first member 10 includes a lower surface of the lower plate 22 facing downward. In the present embodiment, a part of the lower surface of the first member 10 faces the second member 30. The lower surface of the first member 10 facing the second member 30 includes the lower surface of the flat plate 22A and lower surfaces of the spacers 22B. The lower surfaces of the spacers 22B are disposed downward with respect to the lower surface of the flat plate 22A. In the following description, the lower surfaces of the spacers 22B will each be referred to as a first lower surface 15 as appropriate, whereas the lower surface of the flat plate 22A will be referred to as a second lower surface 16 as appropriate.

The flat plate 22A has the uniform thickness as described above. Accordingly, in the first member 10, the thickness of a first portion having the first lower surface 15 is thicker than the thickness of a second portion having the second lower surface 16. The second portion is formed of only the flat plate 22A of the lower plate 22 of the first member 10. The first portion is formed of the flat plate 22A and the spacer 22B of the lower plate 22 of the first member 10.

A plurality of the first portions each including the first lower surface 15 is provided at intervals in the vehicle width direction. The second portion including the second lower surface 16 is provided between the first portions.

Moreover, the first member 10 has a female screw hole 17 (second female screw hole) that is provided on the upper surface of the first member 10 to be connected with a male screw of an eyebolt being a hoisting attachment. The female screw hole 17 is provided on the upper plate 21. In the present embodiment, two of the female screw holes 17 are provided at intervals in the front-rear direction.

The connecting plate 25 is connected to the front frame 102F. The connecting plate 25 is a flat plate with a uniform thickness. The connecting plate 25 is welded to the inner plate 23. An upper end of the connecting plate 25 is disposed upward with respect to the upper end of the inner plate 23. A rear end of the connecting plate 25 is disposed rearward with respect to the rear end of the inner plate 23.

The connecting plate 25 includes an inner surface that is in contact with the front frame 102F, and an outer surface that is fixed to the inner plate 23. The connecting plate 25 is provided with a hole 27 in which the connecting member 2 is disposed. The hole 27 passes through the inner and outer surfaces of the connecting plate 25. A male screw of the connecting member 2 disposed in the hole 27 is connected with a female screw hole provided in the front frame 102F to allow the first member 10 to be connected to the front frame 102F.

[Second Member]

Figure 10:
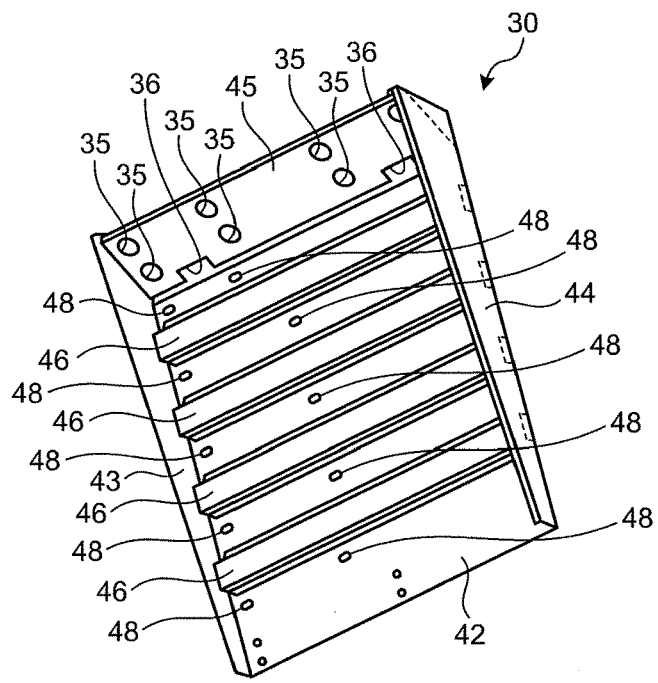
FIG. 10 is a front perspective view of a second member according to the present embodiment.
Figure 11:
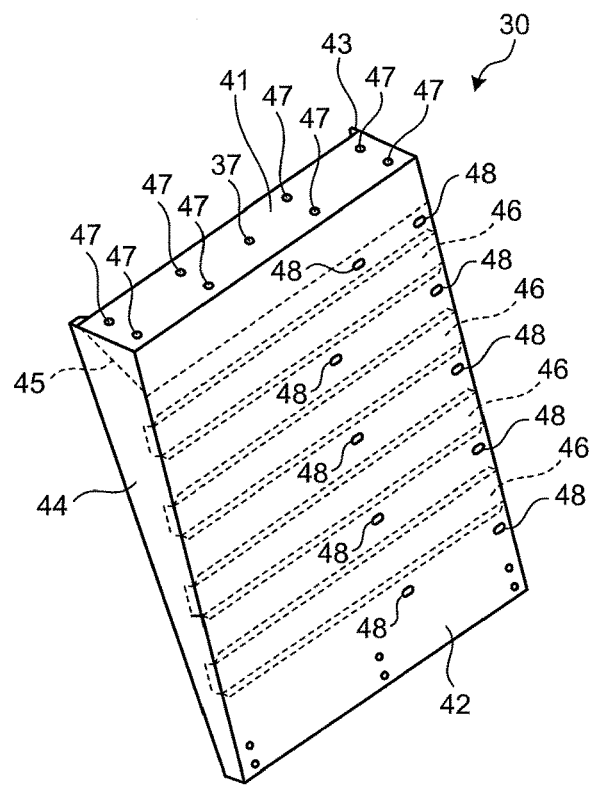
FIG. 11 is a rear perspective view of the second member according to the present embodiment.

FIG. 10 is a front perspective view of the second member 30 according to the present embodiment. FIG. 11 is a rear perspective view of the second member 30 according to the present embodiment. As illustrated in FIGS. 6, 7, 10, and 11, the second member 30 includes an upper plate 41, a rear plate 42, an inner plate 43 disposed on the inner side in the vehicle width direction, an outer plate 44 disposed on the outer side in the vehicle width direction, and a rib member 46 provided on a front surface of the rear plate 42.

The upper plate 41, the rear plate 42, the inner plate 43, and the outer plate 44 are formed by bending a sheet of metal, for example. The upper plate 41, the rear plate 42, the inner plate 43, and the outer plate 44 are each a flat plate with a uniform thickness.

Upper and lower surfaces of the upper plate 41 are substantially orthogonal to the vertical axis. The upper surface of the upper plate 41 faces the lower surface of the first member 10 including the first lower surface 15 and the second lower surface 16. The first lower surface 15 of the first member 10 is in contact with the upper surface of the upper plate 41 of the second member 30. The second lower surface 16 of the first member 10 faces the upper surface of the upper plate 41 of the second member 30 while being spaced from the upper surface.

The front surface and a rear surface of the rear plate 42 intersect with the front-rear axis. The front and rear surfaces of the rear plate 42 are inclined downward and rearward. The rear plate 42 is connected to a rear end of the upper plate 41 and disposed rearward with respect to the front tire 106F.

The inner plate 43 includes an inner surface that can face the front frame 102F and an outer surface that faces an opposite direction from the inner surface. The inner and outer surfaces of the inner plate 43 are substantially orthogonal to the vehicle width axis. An upper end of the inner plate 43 is connected to an inner end of the upper plate 41. A rear end of the inner plate 43 is connected to an inner end of the rear plate 42. A front end of the inner plate 43 is inclined downward and rearward.

The outer plate 44 includes an inner surface that faces the outer surface of the inner plate 43 while being spaced therefrom, and an outer surface that faces an opposite direction from the inner surface. The inner and outer surfaces of the outer plate 44 are substantially orthogonal to the vehicle width axis. An upper end of the outer plate 44 is connected to an outer end of the upper plate 41. A rear end of the outer plate 44 is connected to an outer end of the rear plate 42. A front end of the outer plate 44 is inclined downward and rearward.

In the present embodiment, the outer shape and dimensions of the inner plate 43 are substantially identical to the outer shape and dimensions of the outer plate 44. Note that the outer shape of the inner plate 43 may be different from the outer shape of the outer plate 44.

The rib member 46 is fixed to the front surface of the rear plate 42. The rib member 46 is long in the vehicle width direction. One end of the rib member 46 is connected to the inner plate 43, while another end of the rib member 46 is connected to the outer plate 44. A plurality of the rib members 46 is provided at intervals in the vertical direction. The rib member 46 is welded to each of the rear plate 42, the inner plate 43, and the outer plate 44.

[Inclined Plate]

An inclined plate 45 is a flat plate with a uniform thickness. The inclined plate 45 is inclined downward and rearward. The inclined plate 45 is connected to the lower surface of the upper plate 41 and the front surface of the rear plate 42 of the second member 30. In the present embodiment, the inclined plate 45 is connected to each of the front end of the lower surface of the upper plate 41 and a part of the front surface of the rear plate 42. In the present embodiment, the part on the front surface of the rear plate 42 connected to the inclined plate 45 is located between the upper end and an intermediate portion of the front surface in the vertical direction. The inclined plate 45 is welded to each of the upper plate 41, the rear plate 42, the inner plate 43, and the outer plate 44.

The upper plate 41 and the first member 10 are connected by the connecting member 3. The upper plate 41 is provided with a hole 47 in which the connecting member 3 is disposed. The hole 47 passes through the upper and lower surfaces of the upper plate 41. A male screw of the connecting member 3 disposed in the hole 47 is connected with a female screw hole 18 (first female screw hole) provided in the first member 10 to allow the second member 30 to be connected to the first member 10.

As illustrated in FIG. 9, in the present embodiment, the female screw hole 18 connected with the male screw of the connecting member 3 is provided on the first lower surface 15 of the spacer 22B in the first member 10.

The inclined plate 45 is provided immediately below the connecting member 3 connecting the upper plate 41 and the first member 10, and includes a through hole 35 through which the connecting member 3 can pass and a notch hole 36 provided at a lower end of the inclined plate 45.

The through hole 35 passes through lower and upper surfaces of the inclined plate 45. The through hole 35 has a circular shape in the present embodiment. Note that the through hole 35 may have a rectangular shape, for example. The through hole 35 may have any size as long as the connecting member 3 and a tool operating the connecting member 3 can pass through the hole.

In the present embodiment, the upper plate 41 and the first member 10 are connected by the connecting member 3 at each of eight different sites. In other words, eight of the connecting members 3 are used, for example. The through hole 35 is provided immediately below each of the eight connecting members 3. Note that not only eight but any number of the connecting members 3 may be provided. A plurality of the through holes 35 is provided at positions immediately below a plurality of the corresponding holes 47.

The notch hole 36 is provided at a position that is not the center of the inclined plate 45 in the vehicle width direction. In the present embodiment, the notch hole 36 includes an inner side notch hole 36 provided on the inner side in the vehicle width direction with respect to the center of the inclined plate 45, and an outer side notch hole 36 provided on the outer side in the vehicle width direction with respect to the center of the inclined plate 45. Note that the notch hole 36 may be provided near the center of the inclined plate 45 in the vehicle width direction.

With the front surface of the rear plate 42, the notch hole 36 forms a through hole passing through the inclined plate 45. The notch hole 36 has a rectangular shape in the present embodiment. Note that the notch hole 36 may have a semicircular shape, for example. The notch hole 36 is larger in size than the through hole 35 in the present embodiment. Note that the notch 36 may instead be smaller in size than the through hole 35.

Moreover, the second member 30 has a female screw hole 37 that is provided on the upper surface of the second member 30 to be connected with a male screw of an eyebolt being a hoisting attachment. The female screw hole 37 is provided on the upper plate 41. The female screw hole 37 is provided at one site being the center of the upper plate 41 in the vehicle width direction.

Moreover, the rear plate 42 of the second member 30 is provided with a through hole 48 through which the second member 30 and the third member 50 are connected by the connecting member 6.

[Connection Between First Member and Second Member]

Figure 12:
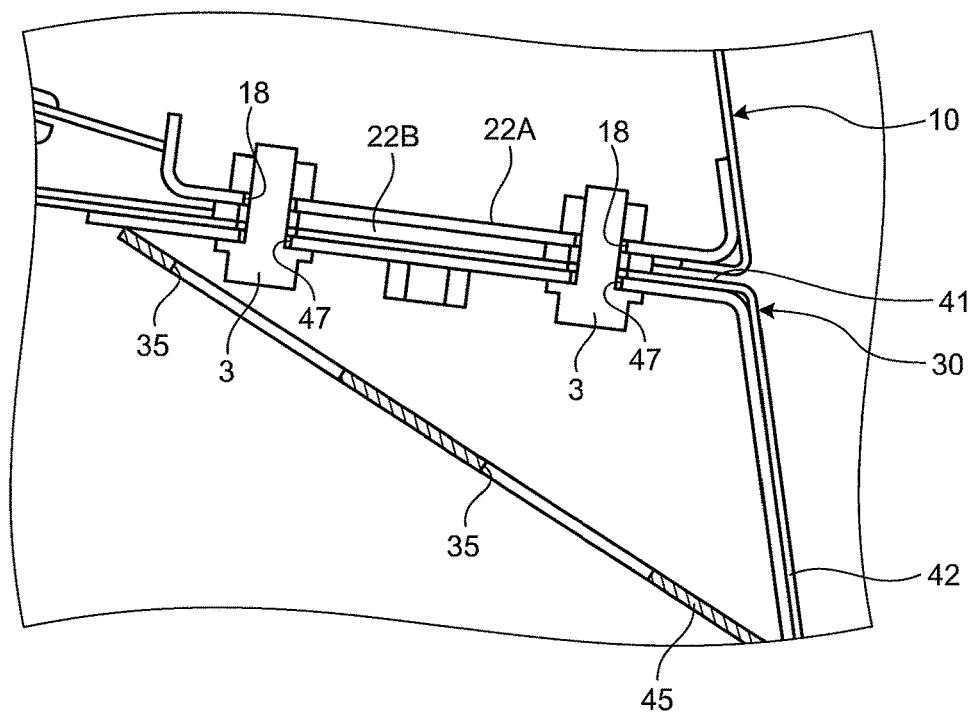
FIG. 12 is a cross-sectional view illustrating an example of a connection structure between the first member and the second member according to the present embodiment.

FIG. 12 is a cross-sectional view illustrating an example of a connection structure between the first member 10 and the second member 30 according to the present embodiment. As illustrated in FIG. 12, the upper surface of the upper plate 41 of the second member 30 is in contact with the first lower surface 15 of the spacer 22B of the first member 10. The upper surface of the upper plate 41 of the second member 30 and the second lower surface 16 of the flat plate 22A of the first member 10 face each other while being spaced from each other. The thickness of the first portion of the first member 10 having the first lower surface 15 is thicker than the thickness of the second portion of the first member 10 having the second lower surface 16.

Two of the connecting members 3 are provided in the front-rear direction. A part of each of the connecting members 3 is disposed in the hole 47 that is the through hole provided in the upper plate 41. The male screw of the connecting member 3 is connected with the female screw hole 18 provided on the first lower surface 15 of the first portion of the first member 10.

[Third Member]

Figure 13:
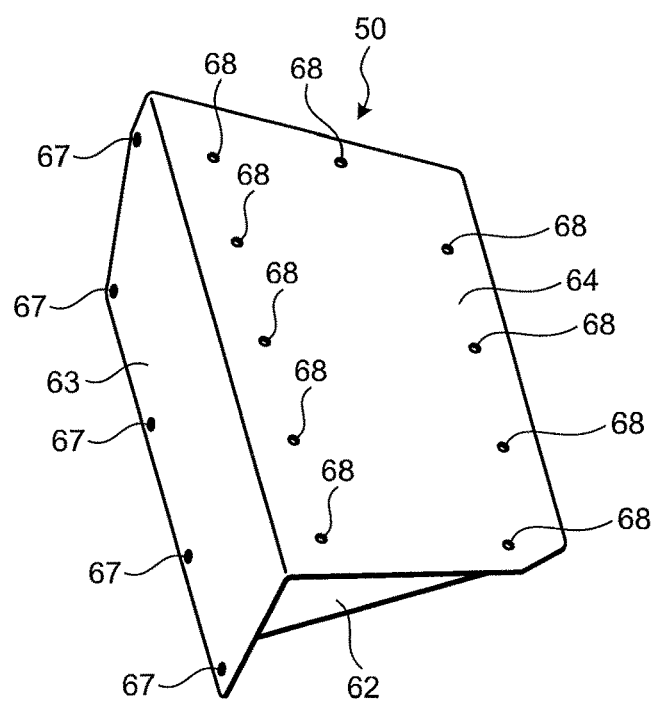
FIG. 13 is a front perspective view of a third member according to the present embodiment.
Figure 14:
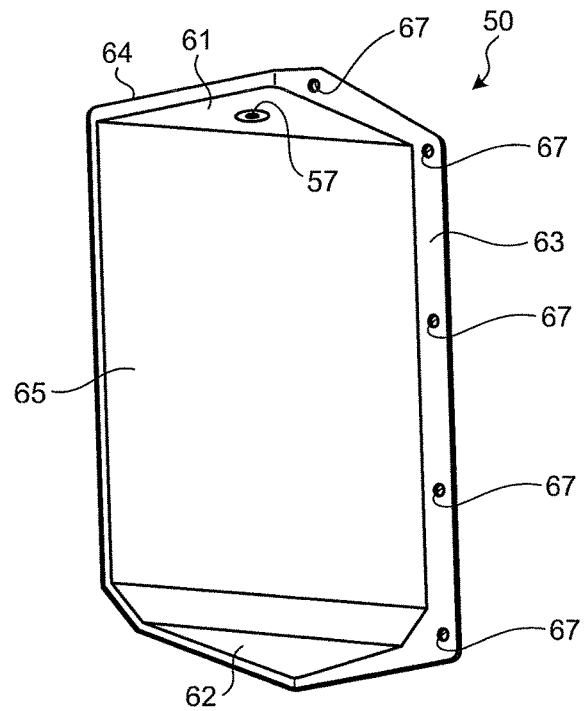
FIG. 14 is a rear perspective view of the third member according to the present embodiment.

FIG. 13 is a front perspective view of the third member 50 according to the present embodiment. FIG. 14 is a rear perspective view of the third member 50 according to the present embodiment. As illustrated in FIGS. 6, 7, 13, and 14, the third member 50 includes an upper plate 61, a lower plate 62, a connecting plate 63 connected to the front frame 102F, a connecting plate 64 connected to the second member 30, and an outer plate 65.

The connecting plates 63 and 64 are formed by bending a sheet of metal, for example. The connecting plates 63 and 64 are each a flat plate with a uniform thickness.

The connecting plate 63 is connected to the front frame 102F. The connecting plate 63 is provided with a hole 67 in which the connecting member 4 is disposed. A male screw of the connecting member 4 disposed in the hole 67 is connected with a female screw hole provided in the front frame 102F to allow the third member 50 to be connected to the front frame 102F.

The connecting plate 64 is connected to the rear plate 42 of the second member 30. The connecting plate 64 is provided with a female screw hole 68 in which the connecting member 6 is disposed. A male screw of the connecting member 6 disposed in the through hole 48 of the second member 30 is connected with the female screw hole 68 provided in the connecting plate 64 of the third member 50 to allow the second member 30 to be connected to the third member 50.

The upper plate 61, the lower plate 62, and the outer plate 65 are each a flat plate with a uniform thickness. The upper plate 61 is welded to the connecting plate 63, the connecting plate 64, and the outer plate 65. The lower plate 62 is welded to the connecting plate 63, the connecting plate 64, and the outer plate 65.

Moreover, the third member 50 has a female screw hole 57 that is provided on the upper surface of the third member 50 to be connected with a male screw of an eyebolt being a hoisting attachment. The female screw hole 57 is provided on the upper plate 61. The female screw hole 57 is provided at one site being roughly the center within the plane of the upper plate 61.

[Positioning Member]

Figure 15:
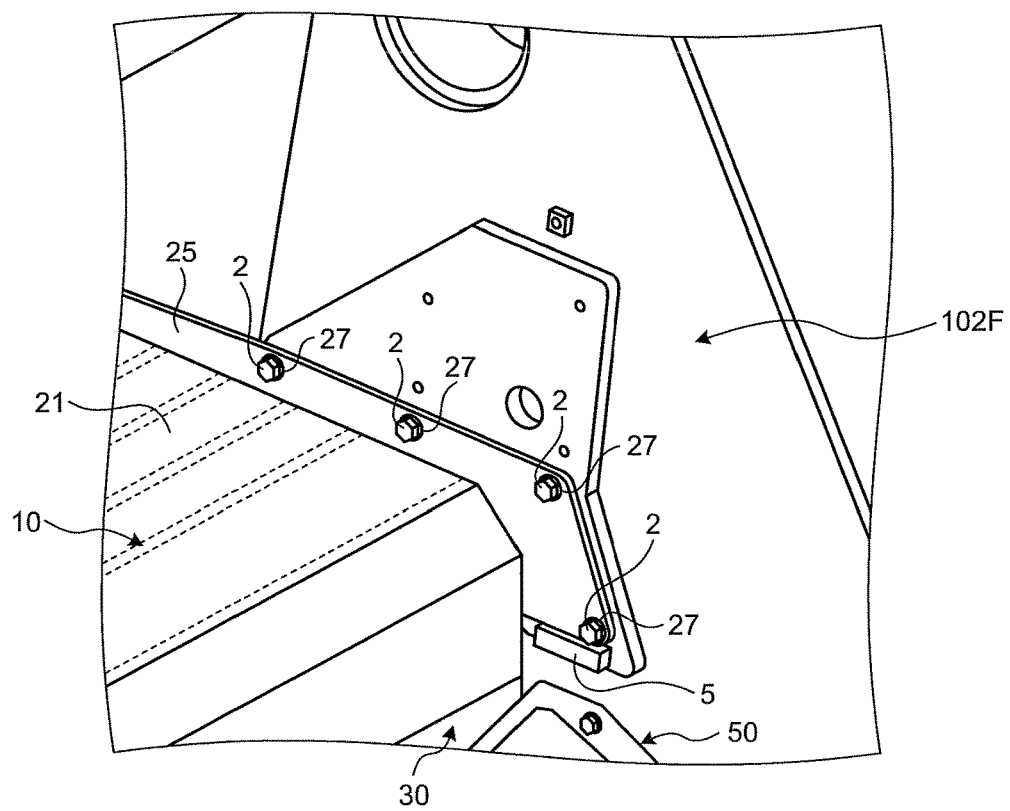
FIG. 15 is an enlarged perspective view of a part of the front frame according to the present embodiment.

FIG. 15 is an enlarged perspective view of a part of the front frame 102F according to the present embodiment. In the present embodiment, the front frame 102F is provided with a positioning member 5 that is in contact with the rear portion of the first member 10 to position the first member 10. The positioning member 5 is fixed to the front frame 102F by welding, for example.

The positioning member 5 protrudes from a side surface of the front frame 102F to the outer side in the vehicle width direction. In the present embodiment, the positioning member 5 is provided at a position in contact with the rear portion at the lower end of the connecting plate 25 of the first member 10. The positioning member 5 is not in contact with the upper plate 21.

[Operation of Mounting and Removing Front Fender to/from Vehicle Body Frame]

Figure 16:
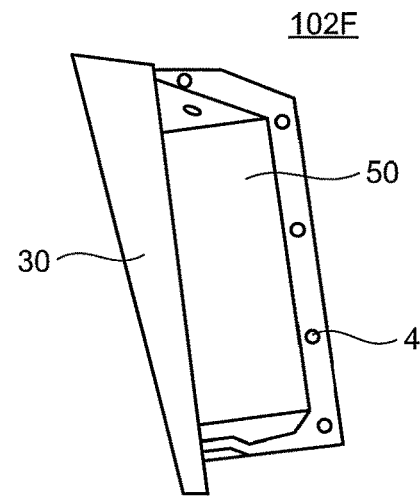
FIG. 16 is a view schematically illustrating an example of an operation in which the front fender of the present embodiment is mounted to the front frame.
Figure 17:
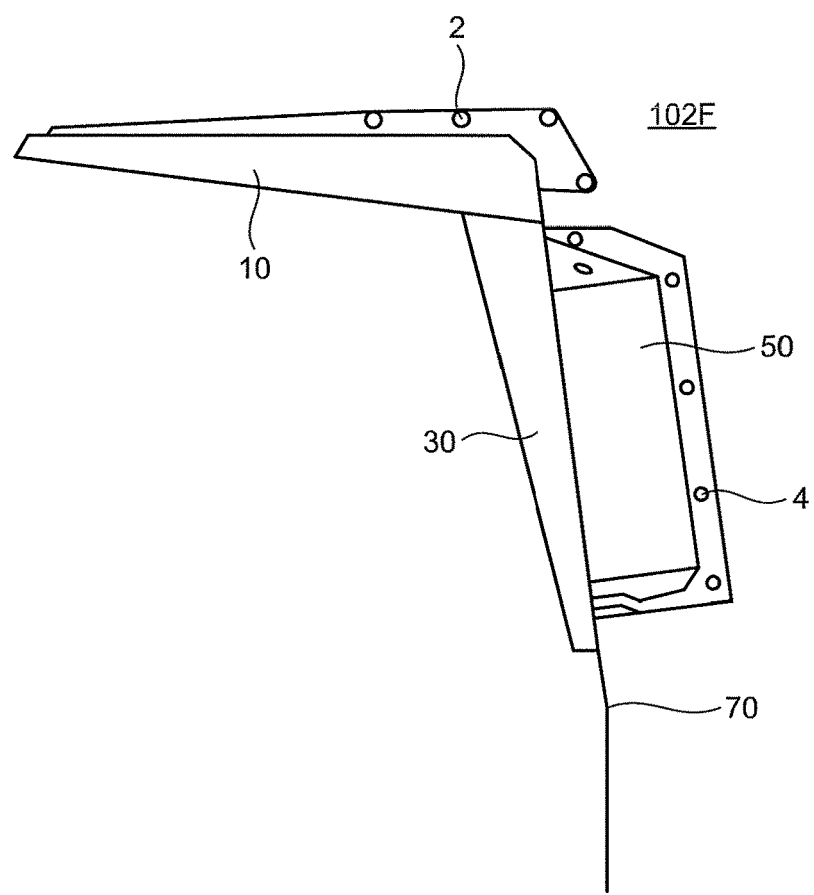
FIG. 17 is a view schematically illustrating an example of the operation in which the front fender of the present embodiment is mounted to the front frame.

FIGS. 16 and 17 are views each schematically illustrating an example of the operation in which the front fender 1 of the present embodiment is mounted to the front frame 102F. As illustrated in FIG. 16, the third member 50 is mounted to the front frame 102F by the connecting member 4. After the third member 50 is connected to the front frame 102F, the second member 30 is connected to the third member 50 by the connecting member 6. As a result, the second member 30 is mounted to the front frame 102F via the third member 50.

Note that the second member 30 and the third member 50 may be connected by the connecting member 6 and thereafter mounted to the front frame 102F.

After the third member 50 and the second member 30 are mounted to the front frame 102F, the first member 10 is connected to the front frame 102F by the connecting member 2. The positioning member 5 is provided in the front frame 102F in the present embodiment. Therefore, the use of the positioning member 5 enables smooth positioning between the hole 27 in the first member 10 and a female screw hole (not illustrated) provided in the front frame 102F. After the execution of positioning between the hole 27 in the first member 10 and the female screw hole provided in the front frame 102F, the first member 10 is connected to the front frame 102F by the connecting member 2.

The first member 10 and the second member 30 are connected by the connecting member 3. In the present embodiment, the inclined plate 45 has the through hole 35, through which the connecting member 3 can pass, immediately below the connecting member 3. The connecting member 3 is thus smoothly disposed in the hole 47 of the upper plate 41 through the through hole 35. A tool that can operate the connecting member 3 can also pass through the through hole 35. When the connecting member 3 is operated with the tool, the male screw of the connecting member 3 is connected with the female screw hole 18 provided on the first lower surface 15 of the first member 10.

The guard member 70 and the second member 30 are connected by the connecting member 7. The front fender 1 is thus mounted to the front frame 102F.

Next, the operation of removing the front fender 1 from the front frame 102F will be described. The first member 10, the second member 30, and the third member 50 are separate members in the present embodiment. Therefore, the first member 10 can be removed from the front frame 102F while the second member 30 and the third member 50 remain mounted to the front frame 102F. When only the first member 10 is to be removed from the front frame 102F, the first member 10 and the front frame 102F connected by the connecting member 2 are disconnected, while at the same time the first member 10 and the second member 30 connected by the connecting member 3 are disconnected. The first member 10 and the second member 30 connected by the connecting member 3 are disconnected when the connecting member 3 is operated by the tool through the through hole 35.

Moreover, in the present embodiment, the disconnection of the first member 10 and the front frame 102F connected by the connecting member 2 as well as the disconnection of the second member 30 and the third member 50 connected by the connecting member 6 allow the first member 10 and the second member 30 to be removed from the front frame 102F while the third member 50 remains mounted to the front frame 102F.

Furthermore, in the present embodiment, the disconnection of the first member 10 and the front frame 102F connected by the connecting member 2 as well as the disconnection of the third member 50 and the front frame 102F connected by the connecting member 4 allow the first member 10, the second member 30, and the third member 50 to be removed together from the front frame 102F.

[Transport Operation of Front Fender]

FIGS. 18, 19, 20, and 21 are views each schematically illustrating an example of the transport operation of the front fender 1 according to the present embodiment.

Figure 18:
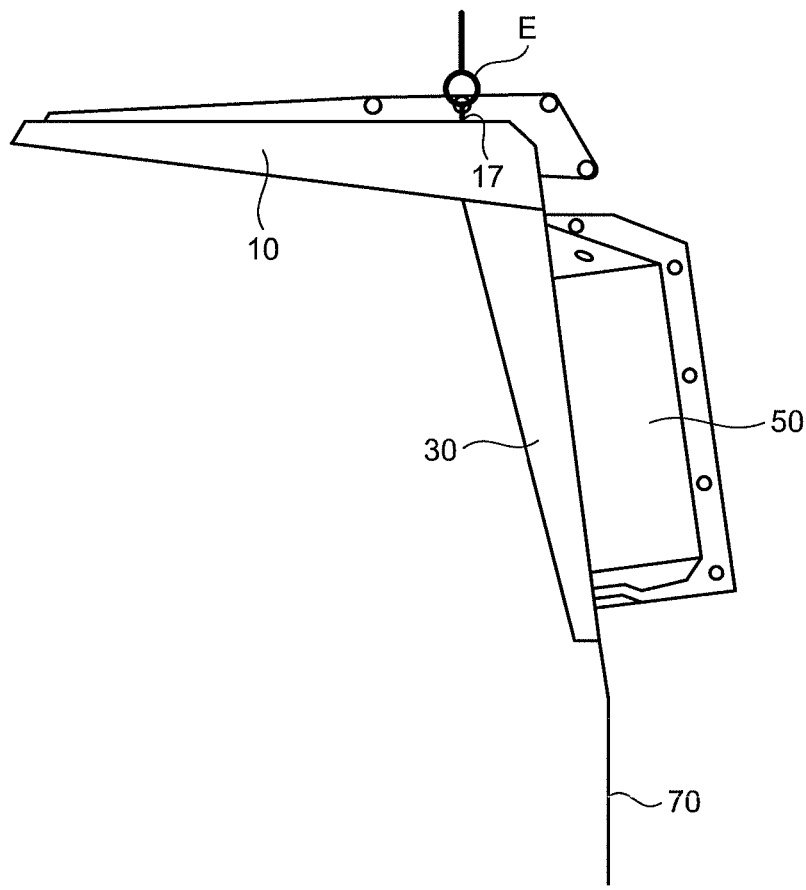
FIG. 18 is a view schematically illustrating an example of a transport operation of the front fender according to the present embodiment.

FIG. 18 illustrates an example where the first member 10, the second member 30, the third member 50, and the guard member 70 are transported together. A male screw of an eyebolt E being a hoisting attachment is connected with the rearward female screw hole 17 of the two female screw holes 17 provided on the upper surface of the first member 10. A transport device such as a crane can hoist and transport the first member 10, the second member 30, the third member 50, and the guard member 70 together via the eyebolt E connected with the female screw hole 17.

Figure 19:
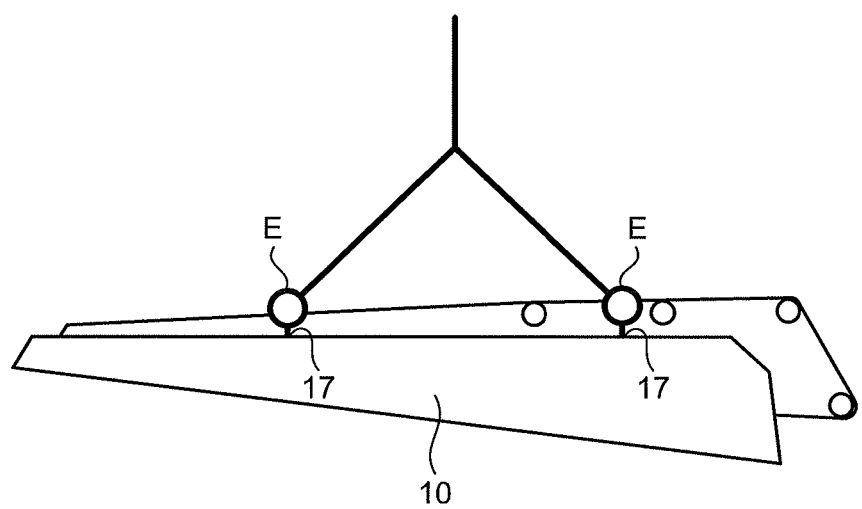
FIG. 19 is a view schematically illustrating an example of the transport operation of the front fender according to the present embodiment.

FIG. 19 illustrates an example where the first member 10 is transported. The male screw of the eyebolt E being the hoisting attachment is connected with each of the two female screw holes 17 provided on the upper surface of the first member 10. The transport device can then hoist and transport the first member 10 via the eyebolt E connected with the female screw hole 17.

Figure 20:
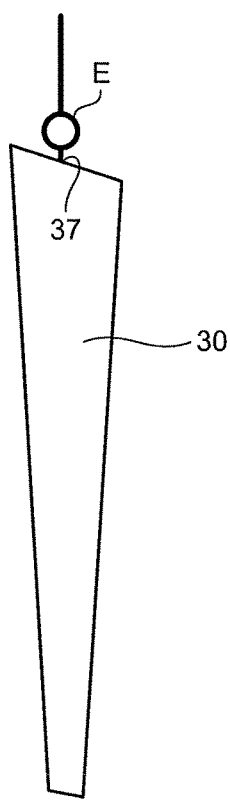
FIG. 20 is a view schematically illustrating an example of the transport operation of the front fender according to the present embodiment.

FIG. 20 illustrates an example where the second member 30 is transported. The male screw of the eyebolt E being the hoisting attachment is connected with the female screw hole 37 provided on the upper surface of the second member 30. The transport device can then hoist and transport the second member 30 via the eyebolt E connected with the female screw hole 37.

Figure 21:
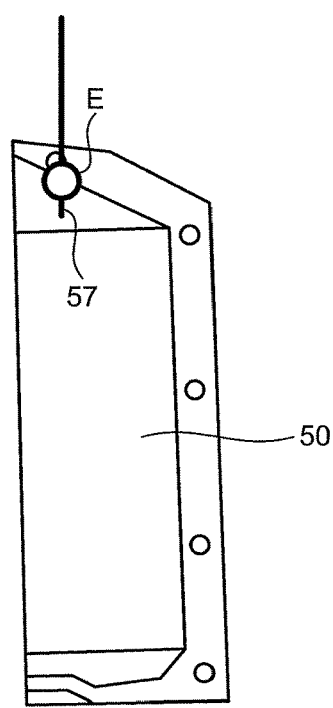
FIG. 21 is a view schematically illustrating an example of the transport operation of the front fender according to the present embodiment.

FIG. 21 illustrates an example where the third member 50 is transported. The male screw of the eyebolt E being the hoisting attachment is connected with the female screw hole 57 provided on the upper surface of the fifth member 50. The transport device can then hoist and transport the third member 50 via the eyebolt E connected with the female screw hole 57.

[Action and Effect]

According to the present embodiment described above, the first member 10 and the second member 30 are detachably connected by the connecting member 3. The first member 10 and the second member 30 can thus be mounted and removed separately to/from the vehicle body frame 102. Therefore, the front fender 1 can be smoothly mounted and removed to/from the vehicle body frame 102 even when the front fender 1 is large in size.

Figure 22:
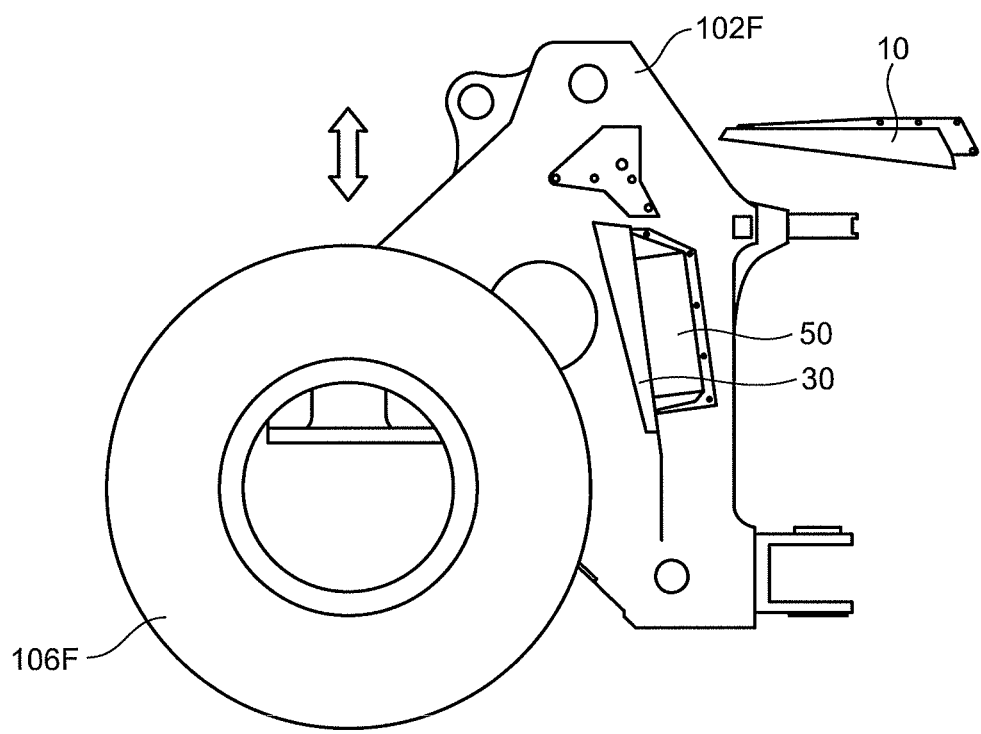
FIG. 22 is a view schematically illustrating an example of a replacement operation of a front tire according to the present embodiment.

The first member 10 and the second member 30 being detachable, the replacement of the front tire 106F as well as the replacement of the front fender 1 can be performed smoothly. FIG. 22 is a view schematically illustrating an example of a replacement operation of the front tire 106F according to the present embodiment. The work implement 200 is omitted in FIG. 22. As illustrated in FIG. 22, when the front tire 106F is to be replaced, an operation of hoisting the front tire 106F upward as indicated by an arrow in FIG. 22 can be performed smoothly by removing not the entire front fender 1 but only the first member 10 from the front frame 102F.

Moreover, in the present embodiment, the inclined plate 45 is provided to cover the connecting member 3 connecting the first member 10 and the second member 30. In other words, the inclined plate 45 is provided between the front tire 106F and the connecting member 3. This prevents dirt from hitting the connecting member 3 even when the dirt flies off by rotation of the front tire 106F while the wheel loader 100 is in motion, for example. The head of the connecting member 3 may be worn away or deformed when the dirt hits the connecting member 3. The dirt flying off may also adhere to the connecting member 3 and be fixed thereto. When the head of the connecting member 3 is deformed or the dirt adhering to the connecting member 3 is fixed thereto, workability of the operation of removing the connecting member 3 from the female screw hole 18 declines. In the present embodiment, the inclined plate 45 is disposed between the front tire 106F and the connecting member 3 to prevent dirt from hitting and/or adhering to the connecting member 3.

The inclined plate 45 is also provided with the through hole 35 in the present embodiment. As a result, the operation of connecting the connecting member 3 with the female screw hole 18 and the operation of removing the connecting member 3 from the female screw hole 18 can be performed smoothly.

The notch hole 36 is provided at the lower end of the inclined plate 45 in the present embodiment. This allows the connecting member 3 to be cleaned smoothly through the notch hole 36. Moreover, a foreign matter in internal space defined by the upper surface of the inclined plate 45, the lower surface of the upper plate 41, the front surface of the rear plate 42, the outer surface of the inner plate 43, and the inner surface of the outer plate 44 can be smoothly discharged to outer space through the notch hole 36. It is possible, for example, that the dirt flying off by rotation of the front tire 106F partly gets into the internal space through the through hole 35 and adheres to the connecting member 3 and/or adheres to an inner wall of the internal space, the internal space being defined by the upper surface of the inclined plate 45, the lower surface of the upper plate 41, the front surface of the rear plate 42, the outer surface of the inner plate 43, and the inner surface of the outer plate 44. With the notch hole 36 and the through hole 35 being provided, a cleaning tool can be inserted into the notch hole 36 or the through hole 35 to clean the connecting member 3 or the inner wall of the internal space. The cleaning tool includes a cleaning nozzle that can spray cleaning fluid, for example. The dirt adhering to the connecting member 3 or the inner wall of the internal space can be removed by the cleaning fluid sprayed from the cleaning tool. The notch hole 36 is provided at the lower end of the inclined plate 45.

Accordingly, a foreign matter containing at least one of the cleaning fluid after cleaning, the dirt removed from the connecting member 3, and the dirt removed from the inner wall of the internal space is smoothly discharged through the notch hole 36 to the outer side of the internal space by the action of gravity. Therefore, in the present embodiment, the notch hole 36 is provided to enable smooth execution of the operation of cleaning the connecting member 3 and the inner wall of the internal space. The cleaning fluid having contributed to cleaning and the dirt removed from the connecting member 3 or the inner wall of the internal space are smoothly discharged from the internal space through the notch hole 36.

In the present embodiment, the notch hole 36 is provided at the position that is not near the center of the inclined plate 45 in the vehicle width direction. Dirt flying off by rotation of the front tire 106F and getting into the internal space formed of the outer surface of the inner plate 43, the inner surface of the outer plate 44, and the lower surface of the inclined plate 45 is highly likely to accumulate in a corner of the internal space. The dirt getting into the internal space is highly likely to accumulate on the outer surface of the inner plate 43 or the inner surface of the outer plate 44, for example. The accumulation of dirt can be smoothly removed by the cleaning tool that is inserted into the notch hole 36 provided near the outer surface of the inner plate 43 or the inner surface of the outer plate 44.

The first member 10 of the present embodiment is provided with the spacer 22B as well as the first lower surface 15 that is in contact with the upper surface of the upper plate 41 of the second member 30 and the second lower surface 16 that faces the upper surface of the upper plate 41 while being spaced therefrom. In the present embodiment, the first lower surface 15 of the first member 10 is in contact with the upper surface of the upper plate 41 of the second member 30, and the rest of the first member 10 excluding the first lower surface 15 is not in contact with the second member 30. As a result, the positioning of the first member 10 and the second member 30 is performed more accurately. In the first member 10, the thickness of the first portion having the first lower surface 15 is thicker than the thickness of the second portion having the second lower surface 16. This allows the first portion, having high strength, of the first member 10 to be connected to the second member 30.

In the present embodiment, the plurality of the first lower surfaces 16 is provided at intervals in the vehicle width direction. This allows the first member 10 and the second member 30 to be positioned even more accurately.

In the present embodiment, the female screw hole 18 connected with the male screw of the connecting member 3 is provided on the first lower surface 15. The female screw hole 18 is provided in the first portion having high strength so that the deformation of the first member 10 can be prevented even when the male screw of the connecting member 3 and the female screw hole 18 are fastened together.

The first member 10 of the present embodiment further includes the female screw hole 17 that is provided on the upper surface of the first member 10 and connected with the male screw of the hoisting attachment. Accordingly, by connecting the hoisting attachment to the female screw hole 17, the entire front fender 1 can be transported smoothly as described with reference to FIG. 18. Moreover, the first member 10 alone can be transported smoothly as described with reference to FIG. 19.

The positioning member 5 is provided in the front frame 102F in the present embodiment. This enables smooth positioning of the first member 10 and the front frame 102F, whereby workability of mounting the first member 10 to the front frame 102F can be improved.

While the front fender 1 of the wheel loader 100 used in a mine has been described in the present embodiment, the present embodiment does not exclude a wheel loader used in animal husbandry, civil engineering, or snow removing work. The present embodiment does not exclude a backhoe loader or a wheel excavator having a front fender either, and can thus be applied to these work vehicles.

REFERENCE SIGNS LIST

1 FRONT FENDER
2 CONNECTING MEMBER
3 CONNECTING MEMBER
4 CONNECTING MEMBER
5 POSITIONING MEMBER
6 CONNECTING MEMBER
7 CONNECTING MEMBER
10 FIRST MEMBER
11 FRONT END
12 REAR END
13 INNER END
14 OUTER END
15 FIRST LOWER SURFACE
16 SECOND LOWER SURFACE
17 FEMALE SCREW HOLE (SECOND FEMALE SCREW HOLE)
18 FEMALE SCREW HOLE (FIRST FEMALE SCREW HOLE)
21 UPPER PLATE
21A FLAT PLATE
21B REAR PLATE
21C INCLINED PLATE
22 LOWER PLATE
22A FLAT PLATE
22B SPACER
22C INCLINED PLATE
23 INNER PLATE
24 OUTER PLATE
25 CONNECTING PLATE
26 RIB MEMBER
27 HOLE
30 SECOND MEMBER
31 UPPER END
32 LOWER END
33 INNER END
34 OUTER END
35 THROUGH HOLE
36 NOTCH HOLE
37 FEMALE SCREW HOLE
41 UPPER PLATE
42 REAR PLATE
43 INNER PLATE
44 OUTER PLATE
45 INCLINED PLATE
46 RIB MEMBER
47 HOLE
48 THROUGH HOLE
50 THIRD MEMBER
51 UPPER END
52 LOWER END
53 INNER END
54 OUTER END
57 FEMALE SCREW HOLE
61 UPPER PLATE

62 LOWER PLATE
63 CONNECTING PLATE
64 CONNECTING PLATE
65 OUTER PLATE
67 HOLE
68 FEMALE SCREW HOLE
70 GUARD MEMBER
71 UPPER END
72 LOWER END
73 INNER END
74 OUTER END
100 WHEEL LOADER
102 VEHICLE BODY FRAME
102F FRONT FRAME
102R REAR FRAME
103 OPERATOR'S CAB
104 TRAVELING UNIT
105 WHEEL
105F FRONT WHEEL
105R REAR WHEEL
106 TIRE
106F FRONT TIRE
106R REAR TIRE
110 JOINT MECHANISM
200 WORK IMPLEMENT
201 BOOM
202 BUCKET
202B BLADE
203 BELL CRANK
204 LINK
211 BOOM CYLINDER
212 BUCKET CYLINDER
FX AXLE
RS GROUND
RX AXLE

The invention claimed is:

1. A front fender comprising:
a first member, at least a part of which is disposed upward with respect to a front tire of a wheel loader;
a second member which includes an upper plate having an upper surface facing a lower surface of the first member, and a rear plate which is connected to a rear end of the upper plate and disposed rearward with respect to the front tire;
an inclined plate which is connected to a lower surface of the upper plate and a front surface of the rear plate; and
a connecting member which connects the upper plate and the first member, wherein
the inclined plate includes a through hole which is provided immediately below the connecting member and through which the connecting member passes, and a notch hole which is provided at a lower end of the inclined plate.

2. The front fender according to claim 1, wherein the notch hole is provided at a position different from a center of the inclined plate in a vehicle width direction parallel to an axle of the front tire.

3. The front fender according to claim 1, wherein
the lower surface of the first member includes a first lower surface which is in contact with the upper surface of the upper plate, and a second lower surface which faces the upper surface of the upper plate while being spaced from the upper surface, and
in the first member, a first portion having the first lower surface is thicker than a second portion having the second lower surface.

4. The front fender according to claim 3, wherein a plurality of the first lower surfaces is provided at intervals in the vehicle width direction parallel to the axle of the front tire.

5. The front fender according to claim 3, wherein the first member includes a first female screw hole which is provided on the first lower surface and connected with a male screw of the connecting member.

6. The front fender according to claim 1, wherein the first member includes a second female screw hole which is provided on an upper surface of the first member and connected with a male screw of a hoisting attachment.

7. A wheel loader comprising a vehicle body frame to which the front fender according to claim 1 is mounted.

8. The wheel loader according to claim 7, comprising a positioning member which is fixed to the vehicle body frame and is in contact with a rear portion of the first member to position the first member.

* * * * *